F. W. BURNETT.
LOCK NUT FOR BOLTS.
APPLICATION FILED MAY 28, 1914.
1,136,310.
Patented Apr. 20, 1915.
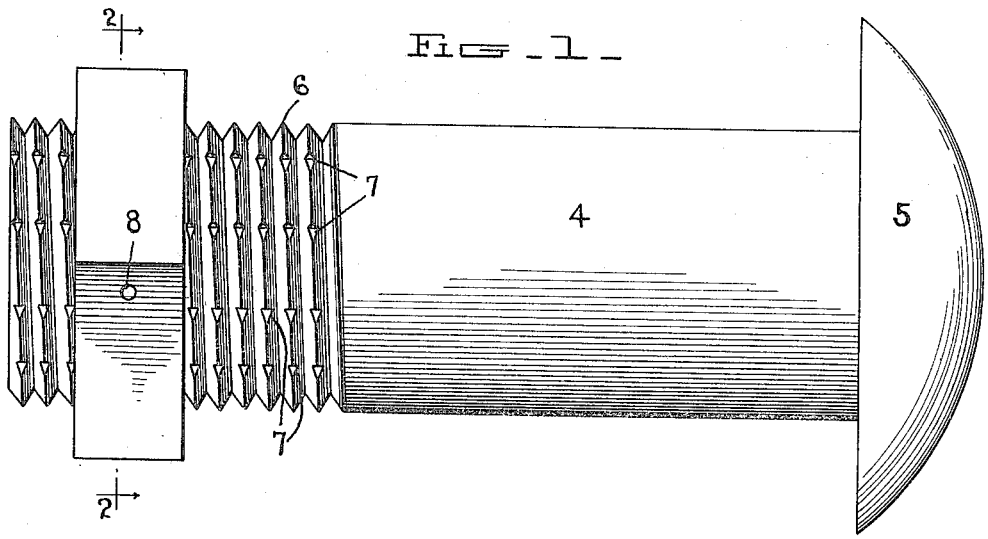
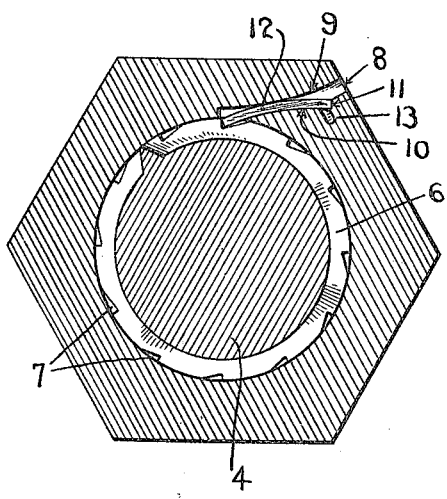
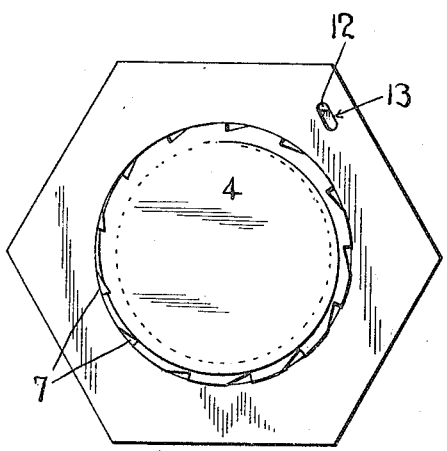
Frank W. Burnett
Inventor
Witnesses
L. B. James
E. G. McCarthy
By Sidney F. Taliaferro
Attorney

UNITED STATES PATENT OFFICE.

FRANK W. BURNETT, OF ROANOKE, VIRGINIA.

LOCK-NUT FOR BOLTS.

1,136,310.  Specification of Letters Patent.  Patented Apr. 20, 1915.

Application filed May 28, 1914. Serial No. 841,515.

*To all whom it may concern:*

Be it known that I, FRANK W. BURNETT, a citizen of the United States, residing at Roanoke, in the county of Roanoke and State of Virginia, have invented a new and useful Lock-Nut for a Bolt or Bolts, of which the following is a specification.

The present invention relates to means for securing nuts on bolts to prevent accidental loosening and removal, and the principal object is to provide a simple structure of novel character, which secures the above result, and at the same time permits the nut to be freed, so that it can be removed if desired.

An embodiment of the invention that is at present considered the preferable one, is illustrated in the accompanying drawings, wherein:—

Figure 1 is a side elevation of a bolt and nut thereon, said nut being provided with the locking mechanism. Fig. 2 is a sectional view on the line 2—2 of Fig. 1. Fig. 3 is an end elevation.

Similar reference numerals designate corresponding parts in all the figures of the drawings.

In the embodiment disclosed, the bolt, which is designated 4, may be of any desired character, having a head 5 at one end, and having its other end threaded, as illustrated at 6. Cut into the threads are transverse notches 7 located in alined rows. These notches do not extend to the depth of the thread in order that said thread shall not be greatly weakened.

The nut, as shown more particularly in Fig. 2, has a transverse recess 8 therein, said recess opening through the outer side and into the bolt-receiving opening or bore of the nut, but being closed on all sides. The opposite walls 9 and 10 of this recess are inwardly and oppositely curved to form a contraction at a point between its ends, and said recess has a stop shoulder 11 in its outer portion at one side of the contraction. A leaf spring 12 is located in the recess, said spring conforming substantially to the curve of and fitting against the wall 10, the inner end of the spring projecting into the bolt-receiving opening of the nut, and engaging in the notches 7 of the bolt. The intermediate portion of the spring substantially fills the contracted portion of the recess, and the outer end of the spring engages or abuts against the stop shoulder 11. An elongated opening 13 is formed in the outer side of the nut and intersects the recess 8, being so located with respect thereto that a punch or tool, inserted into said opening, may be engaged with the outer end of the spring 12 in order that said end may be disengaged from the shoulder 11. In forming the recess 8, the nut may be made in sections, the recess cut in one of the same, and the two sections welded together to produce a unitary structure.

In using the device, the spring is inserted into the recess, through its outer end until the outer end of said spring snaps over the shoulder 11, whereupon the inner end of the spring will project into the bolt-receiving opening. The nut may be threaded on the bolt in the ordinary manner, and as it is rotated, it will ride on the thread, dropping successively into the notches 7. Consequently, after said nut has been screwed home, it will not be accidentally jarred loose from the bolt 4, because the spring 12 engaged in one of the notches will prevent such action. To release the nut, it is only necessary to insert the tool in the opening 13, press the outer end of the spring 12 free of the shoulder 11, whereupon if the nut is then moved in a direction to loosen it, the spring will be moved longitudinally back into the recess 8.

I claim:

1. In a device of the character set forth, the combination with a bolt having notches in its threads, of a nut threaded on the bolt and having a transverse recess extending from its bore through to one side of the nut, the walls of said recess being oppositely curved to form a contraction at a point between its ends, said recess having a stop shoulder in its outer portion at one side of the contraction, and a leaf spring located in the recess, said spring conforming substantially to the curve of and fitting against one wall of the recess, the inner end of the spring projecting into the bolt-receiving opening of the nut and engaging in one of the notches of the bolt, the intermediate portion of the spring substantially filling the contracted portion of the recess and the outer end of the spring engaging the stop shoulder.

2. In a device of the character described, the combination with a bolt having a notch, of a nut threaded on the bolt and having a transverse recess, said recess opening into the bolt-receiving opening of the nut and being closed on all sides, being furthermore provided with an enlarged internal portion and a shoulder in one wall at said enlargement, and a spring located in the recess, the inner end of the spring projecting into the bolt-receiving opening of the nut and engaging in the notch of the bolt, the outer end of the spring engaging the stop shoulder and being movable transversely in the enlargement of the recess out of engagement therewith, and said nut having an opening intersecting the enlarged portion of the recess, for receiving a tool, by which the outer end of said spring can be disengaged from the shoulder.

Signed at Roanoke, in the county of Roanoke and State of Virginia, this the 27th day of May, 1914.

F. W. BURNETT.

Witnesses:
JOHN I. EARD,
MARY RONALD.

Copies of this patent may be obtained for five cents each, by addressing the "Commissioner of Patents, Washington, D. C."